Nov. 20, 1951     T. R. SMITH     2,575,690
CONTINUOUS FLOW, ROTARY AND INCLINED
FRACTIONATING UNIT
Filed Feb. 5, 1948     3 Sheets-Sheet 1
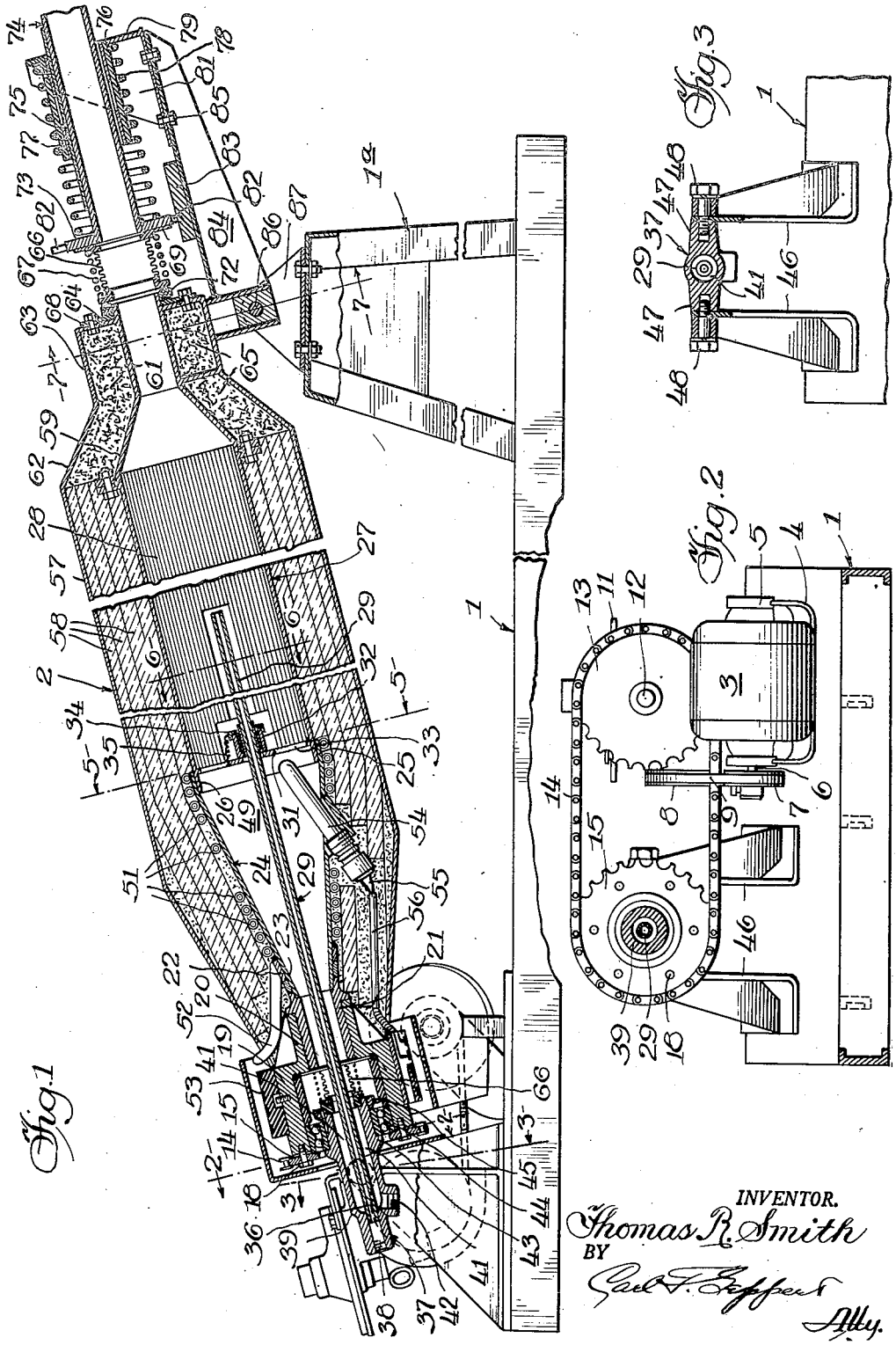
INVENTOR.
Thomas R. Smith
BY
Atty.

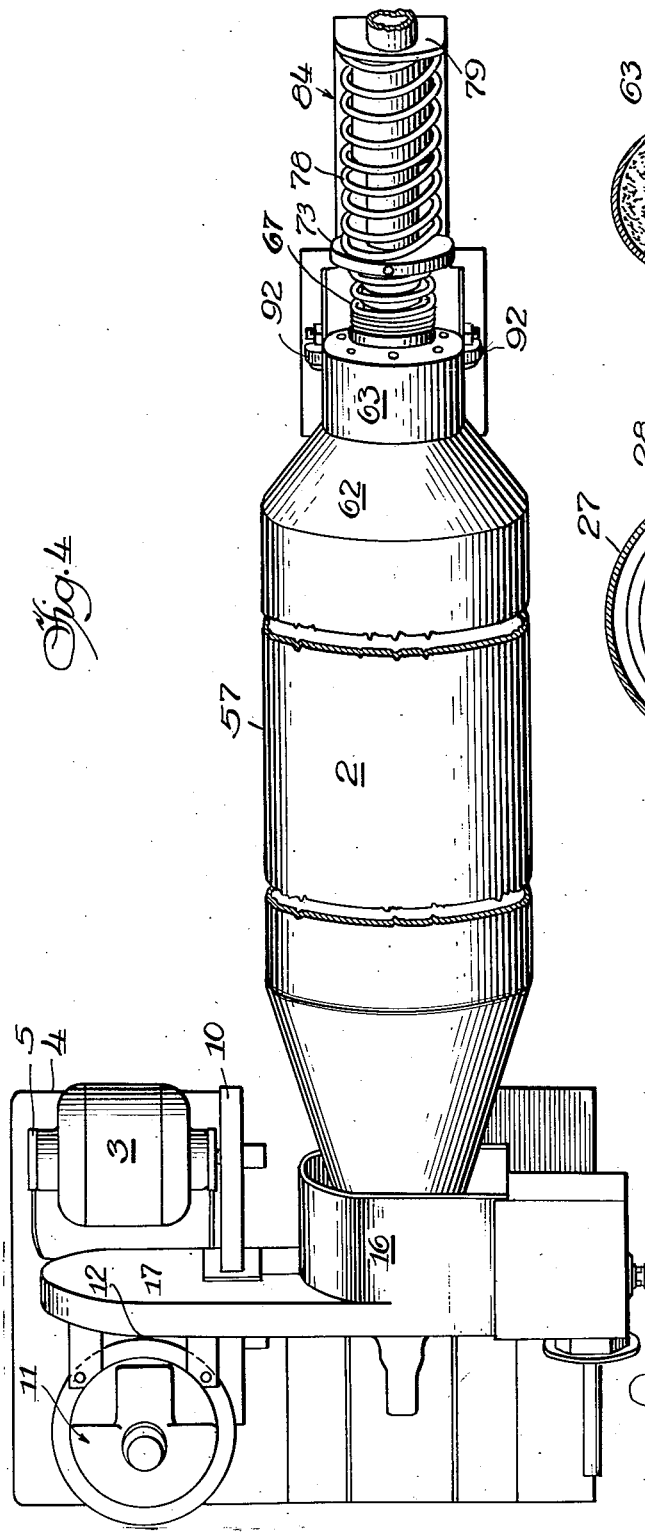
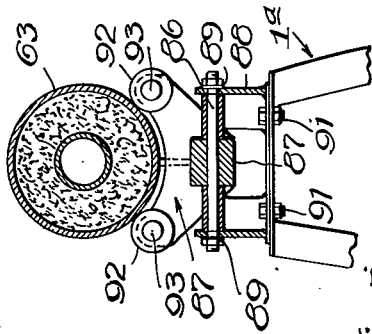
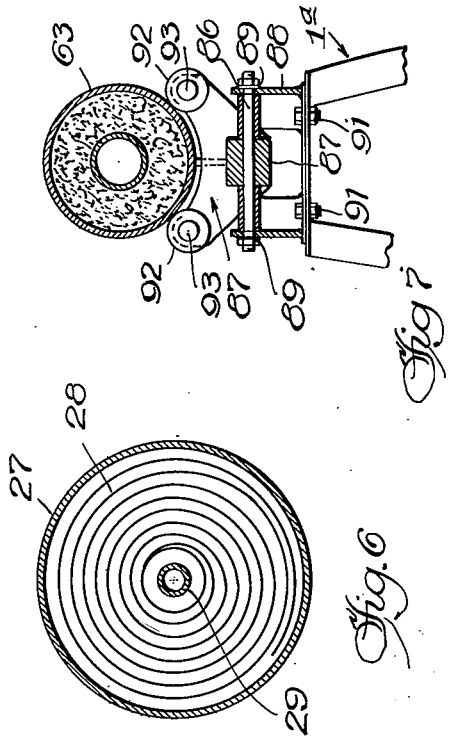
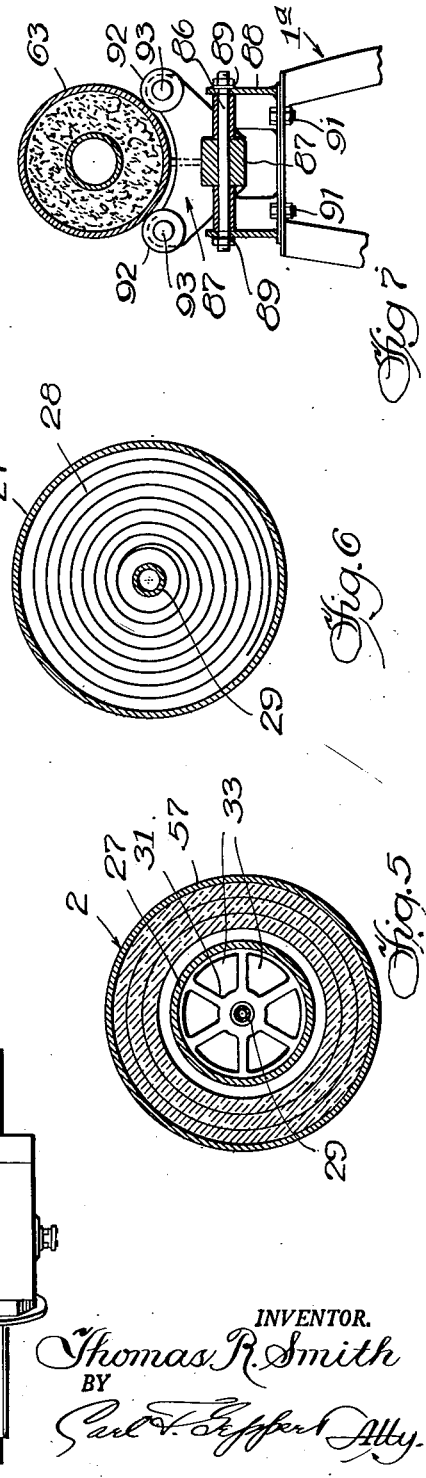

Nov. 20, 1951     T. R. SMITH     2,575,690
CONTINUOUS FLOW, ROTARY AND INCLINED
FRACTIONATING UNIT
Filed Feb. 5, 1948     3 Sheets-Sheet 3
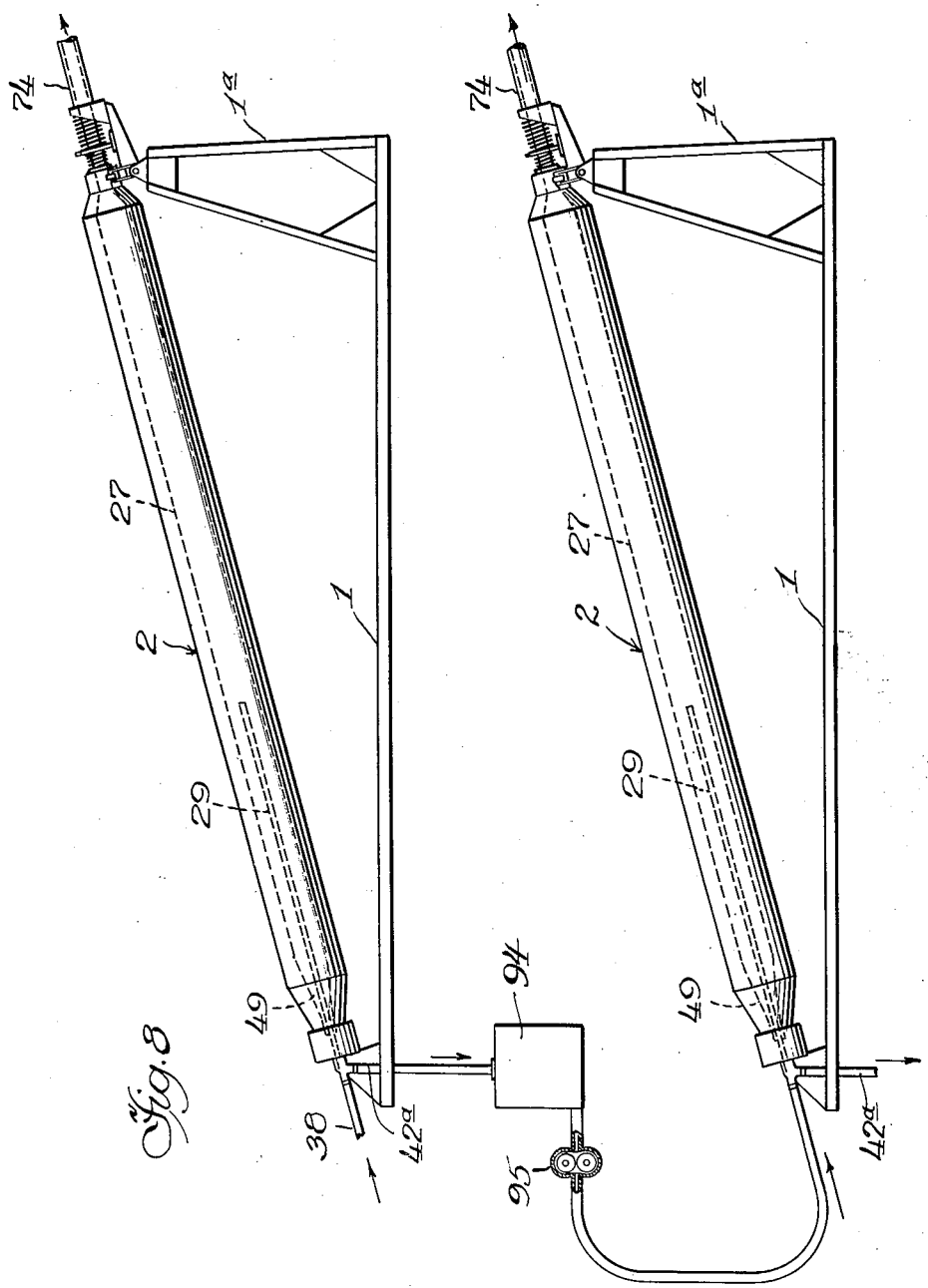
INVENTOR.
Thomas R. Smith
BY
ATTORNEY.

Patented Nov. 20, 1951

2,575,690

UNITED STATES PATENT OFFICE 2,575,690

CONTINUOUS FLOW, ROTARY, AND INCLINED FRACTIONATING UNIT

Thomas R. Smith, Newton, Iowa, assignor to The Maytag Company, Newton, Iowa, a corporation of Delaware Application February 5, 1948, Serial No. 6,456

5 Claims. (Cl. 202—153)

1

The present invention relates to a fractionating unit or column and particularly to a novel rotary and inclined fractionating column of the continuous flow type for most effective and continuous distillation of a fluid for obtaining a desired fraction.

The present invention constitutes an important improvement over prior disclosures of fractionating units in that in the present embodiment the pressure and temperature may be maintained relatively constant in the column and thereby effect continuous distillation of a desired fraction from the fluid being treated. The remaining fluid is continuously withdrawn and where one or more different constituents are to be removed from the residue, the residue or returned liquid flows continuously into a similar column wherein the temperature and pressure are at a different value to thereby remove a second or different constituent from the fluid being treated, and the remainder treated in successive columns until all of the desired constituents or fractions are removed.

It is, therefore, an object of the present invention to provide a novel fractionating column for the continuous distillation under relatively constant pressure and temperature of a desired fraction or constituent, and in the novel method and manner of continuously removing in series or sequence of columns the desired constituents.

The present invention further comprehends a novel rotary refluxing or fractionating column so constructed and arranged that the vapors released from the liquid or fluid being treated by the application of heat flow in parallel paths and thereby contact a relatively large exposed area during treatment, and in which the pressure drop through the refluxing column is relatively low from the inlet to the outlet.

Another feature of the present invention is the provision of a novel refluxing or fractionating column that is continuously rotated and provided with a spirally wound screen whereby the entire body of liquid being treated is continuously agitated or moved in such manner as to completely cover a large portion of the screen with fluid, and the heated vapors released from the liquid contact and heat the remaining liquid whereby to vaporize and facilitate the removal of all distillate having the desired characteristics.

Further objects, advantages and capabilities will later more fully appear or are inherent in the novel construction, assembly and manner of operation.

2

In the drawings:

Figure 1 is a fragmentary view in vertical cross-section through the assembly of the fractionating unit or system.

Fig. 2 is a view in vertical cross-section taken in a plane represented by the line 2—2 of Fig. 1.

Fig. 3 is a view in vertical cross-section taken in a plane represented by the line 3—3 of Fig. 1.

Fig. 4 is a fragmentary top plan view of the assembly shown in Fig. 1.

Figs. 5, 6 and 7 are views in vertical cross-section taken in planes represented by the lines 5—5, 6—6 and 7—7, respectively, of Fig. 1.

Fig. 8 is a diagrammatic view showing in side elevaton two reaction chambers or units connected and operated in series.

The embodiment selected to illustrate the present invention in the drawings, comprises an inclined rotary fractionating unit mounted at an angle of approximately 15° with respect to the horizontal and supported upon a base or frame 1 with the upper and lower ends supported on bearings. The column 2 of the unit is adapted to be continuously rotated through suitable drive mechanism such as a motor 3 mounted upon a motor base 4 and bracket 5 supported on the base or frame 1. Mounted on the drive shaft 6 of the motor is a pulley 7 for driving a pulley 8 through a drive belt 9 enclosed within a belt guard 10. The pulley 8 drives suitable gear reducing mechanism in the housing 11 for the power assembly. The stud of a worm wheel or shaft 12 operates a drive sprocket 13 for driving a chain 14 which in turn drives the sprocket 15 for rotating the column 2. A cover 16 and chain guard 17 provides an enclosure and protection for the chain and sprockets.

As disclosed in Fig. 1, the sprocket 15 is suitably connected to the column 2 by means of bolts or the like 18 anchored in the tubular driver 19 forming the lower end of the column. The forward, reduced end 20 of the driver is interiorly threaded to receive the threaded end of a connector 21, the other end of which is flared at 22 to receive the lower reduced end 23 of a substantially cone or funnel-shaped part 24, the outer cylindrical end 25 of which telescopically receives the annular flange or projection 26 of the reaction chamber 27. All interconnecting or telescoping parts are preferably sealed against leakage.

This reaction chamber comprises a cylindrical housing enclosing a spirally wound screen 28 extending for the length of the chamber and completely filling the interior of the chamber through the greater portion of its length, but at the forward end and for substantially one-third the length of the chamber the screen is so formed as to provide an uninterrupted central opening for the insertion of a centrally disposed intake or inlet pipe 29 for the passage of the liquid or fluid to be treated. At its lower end the reaction chamber 27 is provided with a plate or spider 31 to which is secured a hub or bushing 32 providing a mounting or bearing for the inlet pipe and convolutions of the screen, and with the spider provided with suitable openings 33 for passage therethrough of the fluid. A cap 34 is threaded onto the bushing 32 and a lockwire 35 connected to the spider and cap retains the latter anchored in position. Although the screen as shown is spirally wound and is the preferred structure, it is to be understood that the packing in the reaction chamber 27 may be formed from a plurality of perforated cylindrical rings of gradually increasing diameter to provide a plurality of parallel flow paths for the vapor and liquid therein. Under these conditions the fluid being treated would be distributed throughout the reaction chamber by flowing through the perforations.

The outer or forward end 36 of the center pipe 29 extends to the forward end of the unit where it is threaded into the stationary lower bearing mount 37 and in alignment with its liquid inlet 38 through which enters the liquid or fluid to be treated. The lower bearing mount comprises a tubular member 39, the interior of which throughout the greater portion of its length is spaced from the center pipe 29 to provide a passage 41 for the liquid discharged from the reaction column and which passes out through an outlet 42 or discharge port preferably connected in series with the inlet of a second fractionating column whereby another and different fraction of the treated liquid may be extracted. The tubular member 39 is provided with an external annular shoulder 43 against which one end of a bearing assembly 44 abuts and is threaded at its inner end for the reception of a locknut 45 for retaining the bearing in assembled relation.

The bearing assembly mounts the driver 19 for free rotation about the lower bearing mount 37, which although prevented from rotating with the column 2 is mounted for rotation or adjustment on an axis transverse to the axis of rotation of the column whereby to change or adjust the angle of inclination of the column with respect to the horizontal. This is accomplished by providing spaced supporting brackets 46, 46 for supporting in fixed, adjusted position the trunnions 47 projecting from the opposite sides of the lower bearing mount 37 by means of locking bolts 48.

The cone-shaped member 24 is hollow and provides a heating chamber 49, the heat being supplied thereto by encompassing heating coils or elements 51 entering through a conduit 52 from any electrical source through brushes 53. Also disposed in the heating chamber 49 is a thermocouple 54 connected through the leads or wires 55 carried in a conduit 56 to a source of electrical energy.

The reaction or refluxing chamber 27 and the heating chamber 49 are wholly enclosed within and spaced from an insulation cover 57 with the space therebetween filled with an insulation 58, such as aluminum foil having one of its sides bright. Other space between the outer enclosing cover 57 and the heating chamber is filled with insulation to form an effective heat seal.

The upper or discharge end of the reaction chamber 27 is provided with a substantially cone-shaped cap 59 secured thereto and a tube or sleeve 61 connected to the cap for discharge of the vapors. Encompassing the cap 59 and the sleeve 61 is a cover 62 and a collar or sleeve 63, respectively, with the intermediate space therebetween and the end plate 64 filled with suitable insulation 65. Aligned with the passage from the tube or sleeve 61 is a spring-biased bellows type seal 66 having an encompassing coil spring 67 disposed between the seal nose plate 68 and the end plate 69, the seal nose or plate 68 being disposed adjacent to and connected to the plate 64 for the cap 59 which rotates with the fractionating column 2 and is sealed against leakage by the seal assembly 72.

The end plate 69 engages a flange or collar 73 on the head pipe 74 forming a vapor outlet for the separated fraction. This head pipe is disposed in a bearing 75 which in turn is enclosed within a bearing holder 76 and the pipe, bearing and holder locked together by set screws or the like 77. A coil spring 78 encompasses the head pipe and bearing holder and has one end seating against the flange or collar 73 and the other end against the end wall 79 of an end bracket 81, the end wall having an opening in which the upper end of the bearing holder 76 is mounted and through which freely extends the upper end of the head pipe 74. It will thus be seen that the spring 78 permits differential expansion between the fractionating column and the head pipe forming the vapor outlet. Projections or stops 82 on the flange or collar 73 and adapted to engage an abutment 83 on the bearing bracket 84, prevent the head pipe 74 from rotating with the column 2.

The end bracket 81 is suitably secured to the bracket 84 by bolts 85, and this latter bracket is pivotally mounted upon a support bar 86 carried in a bearing bracket 87, the ends of the bar being carried in a trunnion 88 and secured in adjusted position by the nuts 89. The trunnion in turn is secured by bolts or the like 91 upon the support 1ª mounted on the base or frame 1.

To support and permit the upper end of the column to rotate freely, there are provided top bearings 92 each rotatable upon a stub shaft 93 carried in the bearing bracket 87. Upon these top bearings seats and rotates the collar or sleeve 63 at the upper end of the continuously rotating fractionating column. The bellows type seal adjacent this collar or sleeve at the extreme end of the column provides an effective seal between the rotating column and the stationary vapor outlet assembly, and a similar bellows type seal 66 is preferably provided between the lower end of the rotating column and the lower bearing mount 37.

The fractionating unit 2 is mounted for operation in an inclined position and at an angle of approximately 15° with respect to the horizontal, and in this position the upper and lower ends are supported upon the end bearings. The particular unit or system disclosed is especially applicable and effective in the treatment of fatty acid products, petroleum products and other liquid mixtures containing a plurality of individually desirable constituents or products. In operation, the liquid mixture to be treated is continuously admitted to the lower end of the stationary inlet pipe 29 extending to and mounted in the stationary bearing mount 37 at the lowermost end of the unit. This pipe is centrally located and extends upwardly through the rotary heating chamber 49 where the liquid is heated as it passes through the pipe and into the refluxing chamber or fractionating column 27. The discharge end of the inlet pipe is preferably located at the point in the fractionating column where the temperature imparted thereto will be such as to vaporize the desired constituent in the fluid.

In the disclosed embodiment this fractionating column or reaction chamber is approximately ten feet long with the inlet pipe 29 extending into the chamber for approximately one-third this distance where it discharges the liquid to be treated into the spirally wound screen 28. As the column is continuously rotated, the liquid or fluid discharged through the upper end of the pipe 29 is picked up by the spirally wound screen 28 and distributed over a large portion of its surface, with any excess liquid flowing back by gravity through the openings in the spider 31 and back into the heating chamber where it is further heated and vaporized at the prescribed or predetermined temperature. The liquid so vaporized passes out of the heating chamber, through the spider and into the convolutions of the spiral screen where such vapors help to vaporize similar fluids which are still in the liquid state. During this operation some of the desired vapors although condensed or refluxed in heating the make-up liquid discharged onto the screen from the pipe or tube 29, are returned or flow back to the heating chamber 49 and there are again vaporized and then either pass upwardly through the screen to the discharge outlet, or in heating the incoming liquid some may again be condensed and returned for reheating. Consequently, all of the liquid mixture will eventually give off all or substantially all of the fluid which is vaporizable at the prescribed or predetermined temperature and pressure. Any suitable vacuum producing means may be connected to the vapor outlet at the upper end of the unit for thereat drawing off the vapors which are then condensed to provide the desired product.

The residue or remaining liquid which does not vaporize at the desired pressure and temperature, flows through the spiral screen, spider and heating chamber to the outlet or discharge port 42 leading from the space surrounding the inlet tube 29. From the outlet it is continuously drained or pumped for further treatment. As this residue or remaining liquid mixture may have one or more other desirable constituents which require further treatment but under different conditions of pressure and temperature for removal of such other one or more desired constituents, the discharged residue is conducted from the discharge port 42 to a conduit 42ª and to a reservoir 94, from where it is withdrawn by a pump 95 and conducted to a second fractionating unit 2 (see Fig. 8) operating in a similar manner but at a different temperature and pressure to thereby vaporize and separate another constituent.

Any residue or remaining liquid mixture from the second unit not vaporized in its fractionating column may in turn be continuously drained or exhausted therefrom through the conduit 42ª and conducted to a third fractionating unit operating at still another pressure and temperature to thereat distill off or vaporize a third fluid having characteristics differing from the first two. It will thus be seen by passing the liquid to be treated through multiple fractionating columns operating in series any number of desirable constituents may be vaporized and removed, the number depending upon the particular liquid mixture being treated and the number of separate components desired to be removed therefrom.

Although the invention is not to be limited to the disclosed details of construction and operation, excellent results have been secured by the continuous rotation of the fractionating column at approximately 52 revolutions per minute.

When operating the under conditions in which the column requires effective sealing at the upper and lower ends thereof to seal against the atmosphere and to also seal and prevent the discharge of vapors from the unit, the invention comprehends providing the unit with spring-biased bellows disposed between the rotary fractionating column and the stationary parts at the opposite ends of the unit. The temperature and pressure at which the fractionating unit is operated depends upon the selected fraction to be vaporized and removed.

Having thus disclosed my invention, I claim:

1. A fractionating unit comprising an inclined fractionating column, a spirally wound screen packing in said column, a heating chamber in the unit adjacent the lower end thereof, an inlet tube for supplying feed liquid to the column, said tube projecting upwardly through the heating chamber and the lower end of the column and discharging onto the screen, means for continuously rotating said column so as to continuously agitate the liquid being treated and cause it to wet the screen, an outlet at the upper end of the unit for the removal of product vapors, and an outlet at the lower end of the unit for removing liquid residue.

2. A fractionating unit comprising an inclined fractionating column, a packing in said column having spaced perforated coils, a heating chamber in the unit adjacent the lower end thereof, an inlet tube for supplying feed liquid to the column and projecting upwardly through the heating chamber and the lower end of the column and discharging into the interior of the packing adjacent the center thereof, said tube being of sufficient size to permit heat exchange and preheating of the feed liquid as it passes therethrough, means for continuously rotating said column so as to continuously agitate the liquid being treated and cause it to wet the packing, means for withdrawing product vapors from the upper end of the unit, and means for withdrawing liquid residue from the lower end of the unit.

3. A fractionating unit comprising an inclined fractionating column, a spirally wound screen packing in said column with the convolutions spaced apart to provide parallel flow paths for the feed liquid, a heating chamber in the unit adjacent the lower end thereof, an inlet tube for supplying the feed liquid to the column, said tube projecting through the heating chamber and the lower end of the column and discharging onto the screen adjacent the center thereof, means for continuously rotating said column so as to continuously agitate the liquid being treated and cause it to wet the screen, an outlet adjacent the upper end of the unit for the removal of product vapors, and an outlet adjacent the lower end of the unit for removing liquid residue.

4. A fractionating unit comprising an inclined fractionating column, a screen packing in said column having convolutions spaced apart to provide parallel flow paths for the feed liquid, a heating chamber in the unit adjacent the lower end thereof, a supply tube projecting through the heating chamber and the lower end of the column for preheating the feed liquid as it passes through the tube and discharging it onto the screen, means for continuously rotating said column and screen so as to agitate the liquid being treated and cause it to wet the screen, an outlet adjacent the upper end of the unit for the removal of product vapors, and an outlet adjacent the lower end of the unit for removing liquid residue.

5. A fractionating unit comprising an inclined fractionating column, a spirally wound screen packing in said column, a heating chamber in the unit adjacent the lower end thereof, an inlet tube supplying feed liquid to the column, said tube projecting upwardly through the heating chamber and the lower end of the column and discharging onto the screen, means for continuously rotating the column and screen packing so as to continuously agitate the liquid being treated and cause it to wet the screen, said column being open to the heating chamber whereby liquid collecting in the column flows by gravity into the heating chamber where it is reheated and the vapors returned to the column, an outlet at the upper end of the column for the removal of product vapors, and an outlet at the lower end of the unit for removing liquid residue.

THOMAS R. SMITH.

REFERENCES CITED

The following references are of record in the file of this patent:

UNITED STATES PATENTS

| Number | Name | Date |
|---|---|---|
| 8,169 | Anderson | June 17, 1851 |
| 785,472 | Brown | Mar. 21, 1905 |
| 1,104,948 | Woolner | July 28, 1914 |
| 1,183,457 | Herber | May 16, 1916 |
| 1,231,695 | Bell | July 3, 1917 |
| 1,376,631 | Newton et al. | May 3, 1921 |
| 2,192,089 | Long | Feb. 27, 1940 |
| 2,224,325 | Wagner | Dec. 10, 1940 |
| 2,385,074 | Guignard | Sept. 18, 1945 |

FOREIGN PATENTS

| Number | Country | Date |
|---|---|---|
| 365,586 | Germany | Dec. 12, 1922 |
| 348,244 | Great Britain | May 14, 1931 |